BEST AVAILABLE COPY
BEST AVAILABLE COPY

G. L. HAUSSKNECHT.

Running-Gear.

No. 437. Reissued Mar 17. 1857.

AM. PHOTO-LITHO. CO. N.Y. (OSBORNE'S PROCESS.)

G. L. HAUSSKNECHT.

Running-Gear.

No. 437.

Reissued Mar 17, 1857.

AM. PHOTO-LITHO. CO. N.Y. (OSBORNE'S PROCESS.)

UNITED STATES PATENT OFFICE.

GUSTAVUS L. HAUSSKNECHT, OF NEW HAVEN, CONNECTICUT.

IMPROVEMENT IN RUNNING-GEAR OF CARRIAGES.

Specification forming part of Letters Patent No. 8,648, dated January 13, 1852; Reissue No. 437, dated March 17, 1857.

*To all whom it may concern:*

Be it known that I, GUSTAVUS L. HAUSSKNECHT, of the city and county of New Haven, State of Connecticut, have invented certain new and useful Improvements in the Running-Gear of Carriages or Vehicles; and I do hereby declare that the following is a full, clear, and exact description of the same, reference being had to the accompanying drawings, forming part of this specification, in which—

Figure 5:
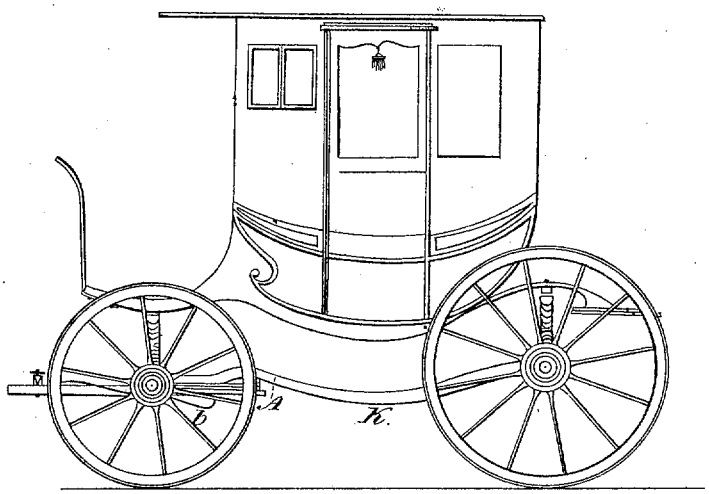
Figure 6:
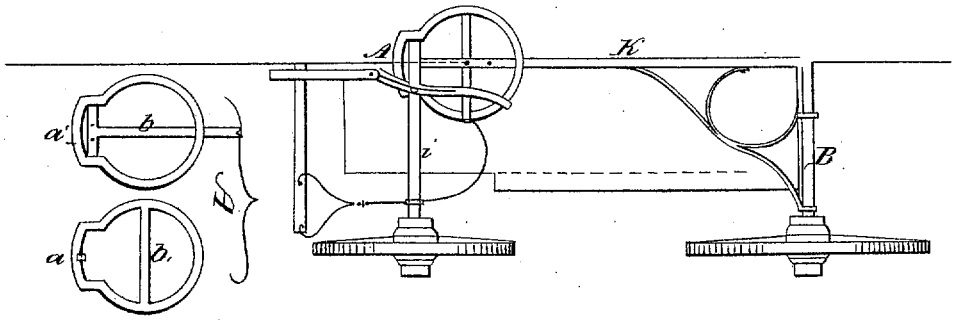
Figure 1:
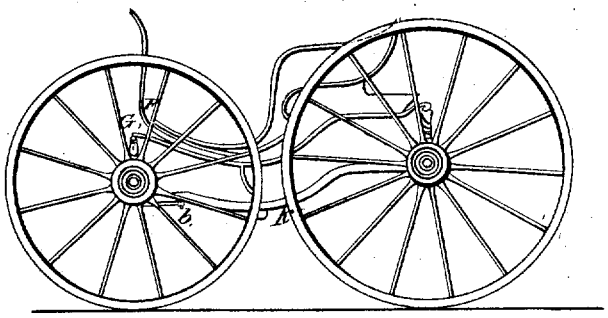
Figure 2:
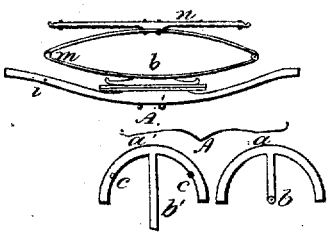
Figure 3:
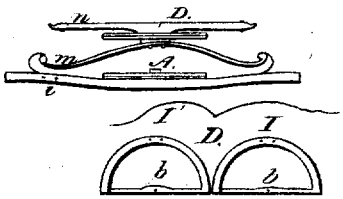
Figure 4:
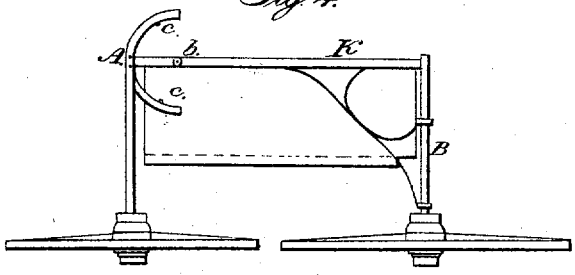

Figure 1 is a side elevation of a carriage. Fig. 2 is a front view of the fore axle or carriage, the wheels being removed and a representation of parts belonging thereto. Fig. 4 is half a bottom view of the same. Fig. 3 represents a view of a fore axle or carriage, the wheels being removed where the spring is fastened to the axle and moving with the same. Fig. 5 is a side elevation of a two-horse carriage. Fig. 6 is half a bottom view of the same.

To enable others skilled in the art to make and use my invention, I will proceed minutely to describe it.

Figs. 1, 2, 4, B is the hind, and *i* is the front, axle, on the ends of which the running-wheels revolve. *m* is the front elliptic spring. The upper half of the spring is firmly secured at its center to the spring-bar *n*, which supports the body of the carriage, and its lower half to the head-block *l*, attached to the end of the perch *k*, and the under side of which is secured to a traveling segment, *a'*, which moves over or upon an under segment, *a*, secured to the front axle. *b* is the center or an eye of the arm attached to the segment which couples the fore axle to the carriage at *b*, where the pivot-pin is secured to a similar arm of the upper segment and made fast to the perch.

A represents the two segments or couplings commonly called "fifth-wheels," to the upper one of which are fastened two hooks, *c c*, projecting over the edge of the lower one, serving as stoppers and preventing from separating.

In Fig. 3, *m* is a spring fastened to the axle *i*, and moving with the same. A represents the couplings of the fore axle. The head-block is dispensed with. *n* is the spring-bar, the under side of which is firmly secured to a traveling segment, *d'*, which moves over or upon an under segment, *d*, fastened to the top of the spring. *b* is the center of the two segments, or where the same are connected by a pin placed perpendicularly over the lower pivot or turning-point of the lower couplings.

The mode of construction at Figs. 5 and 6 is merely the same as described in Figs. 1, 2, 4, only that carriages with stiff poles require full circles or plates called "fifth-wheels," (shown at A,) to resist the weight or action of the pole, which operates as a lever, unless its weight is carried by the horses at the front end.

My improvement permits the use of large fore wheels, with all the advantages derived therefrom, and can be adapted to vehicles or carriages where the body is elevated some distance above the fifth-wheels and axles, describing a quicker curve or smaller circle with perfect safety. The distance of placing the turning-point in rear of the forward axle depends upon the track of wheels—for instance, say eight inches for narrow track, or four inches for wide track. The fore axle and head-block are not weakened by a large king-bolt hole, as in the common mode of construction, and the forward wheels are saved from being strained by cramping around, whereby most of the spokes get loose in the hubs.

I am aware that carriages have been described where the pivot which connects the front running-gear with the hind part or body thereof is placed behind the fore axle, and combined with two segments of circles resting and sliding the one on the other, and the center point of which rests over and some distance above center of the front axle, and I therefore do not not claim this as my invention; but What I do claim as my invention, and for which I ask Letters Patent, is—

1. The combination and arrangement of the pivot in the rear of the fore axle and the segments with the perch and head-block or perch cross-bar of carriages having perches, as hereinbefore described, or the equivalents thereto, for the purpose of enabling carriages to turn in a shorter space than by the common mode of coupling with perfect safety.

2. The additional set of segments, or their equivalents, the pivot placed perpendicularly above the lower turning-point to be employed where the springs are fastened to the axle and move with the same.

GUSTAVUS L. HAUSSKNECHT.

Witnesses:
THOMAS C. DUNN,
CHARLES KEMBEL.